United States Patent
Kim et al.

(10) Patent No.: US 8,274,927 B2
(45) Date of Patent: Sep. 25, 2012

(54) METHOD FOR PERFORMANCE ENHANCEMENT IN A CELL EDGE REGION

(75) Inventors: Sang Gook Kim, San Diego, CA (US);
Young C. Yoon, San Diego, CA (US);
Soonyil Kwon, San Diego, CA (US);
Shu Wang, San Diego, CA (US); Suk Woo Lee, San Diego, CA (US);
Li-Hsiang Sun, San Diego, CA (US);
Hobin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 798 days.

(21) Appl. No.: 11/671,432

(22) Filed: Feb. 5, 2007

(65) Prior Publication Data

US 2007/0183432 A1   Aug. 9, 2007

Related U.S. Application Data

(60) Provisional application No. 60/765,472, filed on Feb. 3, 2006.

(51) Int. Cl.
*H04L 1/00* (2006.01)

(52) U.S. Cl. ......... 370/328; 370/252; 455/527; 455/437

(58) Field of Classification Search .................. 370/328, 370/252; 455/522, 437
See application file for complete search history.

(56) References Cited

U.S. PATENT DOCUMENTS

| | | | | |
|---|---|---|---|---|
| 6,704,898 | B1 * | 3/2004 | Furuskar et al. | 714/751 |
| 6,993,338 | B2 * | 1/2006 | Lee et al. | 455/442 |
| 7,042,858 | B1 * | 5/2006 | Ma et al. | 370/331 |
| 7,079,842 | B2 * | 7/2006 | Nagai | 455/437 |
| 7,212,821 | B2 * | 5/2007 | Laroia et al. | 455/437 |
| 7,397,864 | B2 * | 7/2008 | Tarokh et al. | 375/299 |
| 7,409,630 | B1 * | 8/2008 | Wu et al. | 714/790 |
| 7,515,562 | B2 * | 4/2009 | Lim et al. | 370/331 |

(Continued)

FOREIGN PATENT DOCUMENTS

CN    1150881    5/1997

(Continued)

OTHER PUBLICATIONS

NTT DOCOMO "Investigations on Inter-Secot Diversity in Evolved UTRA Downlink" 3GPP TSG-RAN WG1, R1-050615, Jun. 20, 2005.

(Continued)

*Primary Examiner* — Jinsong Hu
*Assistant Examiner* — Nathan Taylor
(74) *Attorney, Agent, or Firm* — Lee, Hong, Degerman, Kang & Waimey

(57) ABSTRACT

A method for receiving data at different frequencies includes receiving a first transmission packet including data at a first carrier frequency, and receiving a second transmission packet comprising data at a second carrier frequency. The method further includes maintaining communication with transmission entities which transmit the first and second transmission packets, and identifying reception quality of the first and second transmission packets. In addition, a method for retransmitting subpackets includes transmitting a first subpacket of a packet transmission from at least two transmitting entities. Upon receiving a non-acknowledgement NACK generated responsive to the first subpacket, the method further includes alternating transmission of subsequent subpackets from different transmitting entities. Upon receiving an acknowledgement ACK generated responsive to any subpackets of the packet transmission, the method further includes transmitting a first subpacket of a new packet transmission.

4 Claims, 7 Drawing Sheets

U.S. PATENT DOCUMENTS

| | | | |
|---|---|---|---|
| 7,515,565 B2 * | 4/2009 | Kalhan | 370/335 |
| 7,542,448 B2 * | 6/2009 | Qi et al. | 370/331 |
| 2001/0011023 A1 * | 8/2001 | Nishioka et al. | 455/522 |
| 2002/0196742 A1 * | 12/2002 | Baker et al. | 370/252 |
| 2004/0082356 A1 * | 4/2004 | Walton et al. | 455/522 |
| 2005/0094878 A1 * | 5/2005 | Becker | 382/205 |
| 2005/0186983 A1 * | 8/2005 | Iochi | 455/522 |
| 2005/0281228 A1 | 12/2005 | Oh et al. | |
| 2006/0034399 A1 * | 2/2006 | Murao | 375/341 |
| 2007/0162827 A1 * | 7/2007 | Walton et al. | 714/774 |
| 2008/0268844 A1 * | 10/2008 | Ma et al. | 455/436 |
| 2009/0080566 A1 * | 3/2009 | Tong et al. | 375/299 |

FOREIGN PATENT DOCUMENTS

| | | |
|---|---|---|
| CN | 1308821 | 8/2001 |
| CN | 1504053 | 6/2004 |
| JP | 10-145834 | 5/1998 |
| JP | 11-178036 | 7/1999 |
| JP | 2001-069550 | 3/2001 |
| JP | 2001-095037 | 4/2001 |
| JP | 2003-518801 | 6/2003 |
| JP | 2005-323358 | 11/2005 |
| WO | 03081938 A1 | 10/2003 |
| WO | 2005125250 A1 | 12/2005 |

OTHER PUBLICATIONS

Tang, Y. et al. "Coded Transmit Macrodiversity: Block Space Time Coded over Distributed Antenna" IEEE Vehicular Technology Conference, Spring 2001, May 6, 2001.

Tong, W. et al. "Soft packet combing for STC re-transmission to improve H-ARQ performance in MIMO mode" IEEE 802.16 Broadband Wireless Access Working Group, Jul. 7, 2004.

Cai, L et al. "Improved HARQ scheme using channel quality feedback for OFDM systems" IEEE Vehicular Technology Conference, May 17, 2004.

\* cited by examiner

METHOD FOR PERFORMANCE ENHANCEMENT IN A CELL EDGE REGION

CROSS-REFERENCE TO RELATED APPLICATIONS

This application claims benefit of priority from provisional patent application Ser. No. 60/765,472, filed Feb. 3, 2006, the contents of which are hereby incorporated by reference herein in their entirety.

BACKGROUND OF THE INVENTION

1. Field of the Invention

The present invention relates generally to mobile communications, and in particular to methods for improving performance of mobile terminals at the cell (or sector) edge region.

2. Discussion of the Related Art

Numerous access schemes exist to allow multiple users to share a communication medium. One such access scheme is known as code division multiple access (CDMA). In CDMA systems, multiple users share the same carrier frequency and may transmit simultaneously.

The current standard for CDMA systems is contained in specifications published by the Telecommunications Industry Association and Electronics Industry Association (TIA/EIA), and include IS-95A, IS-95B, and other CDMA-type protocols. CDMA systems based on IS-95 technologies are generally known as second generation (2G) systems. New standards for enhancing 2G CDMA systems have been developed and offer significant performance improvements compared to the 2G CDMA standard. One such standard is known as cdma2000. cdma2000 is a wideband, spread-spectrum radio interface that uses CDMA technology to satisfy the needs of third generation (3G) wireless communication systems. Several enhancements of the cdma2000 standard have been developed to facilitate the gradual evolution of third generation wireless communication systems. The cdma2000 variant known as 1xEV-DO is being developed to provide high-speed packet data services as an overlay to existing circuit-switched networks.

As the mobile terminal moves around within the network, the channel conditions change continuously due to fast and slow fading, shadowing, number of users, external interference, and other factors. Such problems increase as the mobile terminal moves further away from the serving base stations and into the cell edge region. Techniques for enhancing performance of the mobile terminal at the cell edge region are therefore desirable.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for receiving data at different frequencies includes receiving a first transmission packet including data at a first carrier frequency, and receiving a second transmission packet comprising data at a second carrier frequency. The method further includes maintaining communication with transmission entities which transmit the first and second transmission packets, and identifying reception quality of the first and second transmission packets. Here the term "packet" is used to refer to a broad unit of data transmission, includes a subpacket.

In one aspect, the method further includes selecting one of the first or second transmission packets based upon the identified reception quality.

In another aspect, the method further includes combining the first and second transmission packets to enhance overall signal reception quality.

In yet another aspect, the data of the first transmission packet and the data of the second transmission packet represent the same identical data.

In still yet another aspect, the data of the first transmission packet and the second packet transmission is a differently encoded version of the same data.

In accordance with an alternative embodiment, a method for receiving data at different tones in multicarrier systems includes receiving a first transmission packet having data at a first set of tones and receiving a second transmission packet having data at a second set of tones. The method further includes maintaining communication with transmission entities which transmit the first transmission packet and the second transmission packet, and identifying reception quality of the first and second transmission packets.

In one feature, the first and second sets of tones represent subcarriers.

In accordance with another embodiment a method for retransmitting subpackets includes transmitting a first subpacket of a packet transmission from at least two transmitting entities. Upon receiving a negative acknowledgement (NACK) generated responsive to the first subpacket, the method further includes alternating transmission of subsequent subpackets from different transmitting entities. Upon receiving an acknowledgement (ACK) generated responsive to any subpackets of the packet transmission, the method further includes transmitting a first subpacket of a new packet transmission.

In one feature, the method further includes identifying which of the first transmission packet or the second transmission packet exhibits higher reception quality, In another aspect, the method further includes receiving a plurality of transmission packets at a corresponding one of a plurality of carrier frequencies.

In yet another aspect, the method further includes transmitting the subsequent subpackets at a different transmission power relative to transmission power used for the first subpacket.

In accordance with an embodiment, a method for retransmitting subpackets includes transmitting a first subpacket of a packet transmission from at least two transmitting entities. Upon receiving a negative acknowledgement (NACK) generated responsive to the first subpacket, the method further includes transmitting, by all of the at least two transmitting entities, subsequent subpackets at different transmission power relative to transmission power used for the first subpacket. Upon receiving an acknowledgement (ACK) generated responsive to any subpackets of the packet transmission, the method further includes transmitting a first subpacket of a new packet transmission.

In one aspect, the method further includes transmitting the subsequent subpackets using increased or decreased transmission power relative to transmission power used for the first subpacket.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Figure 1:
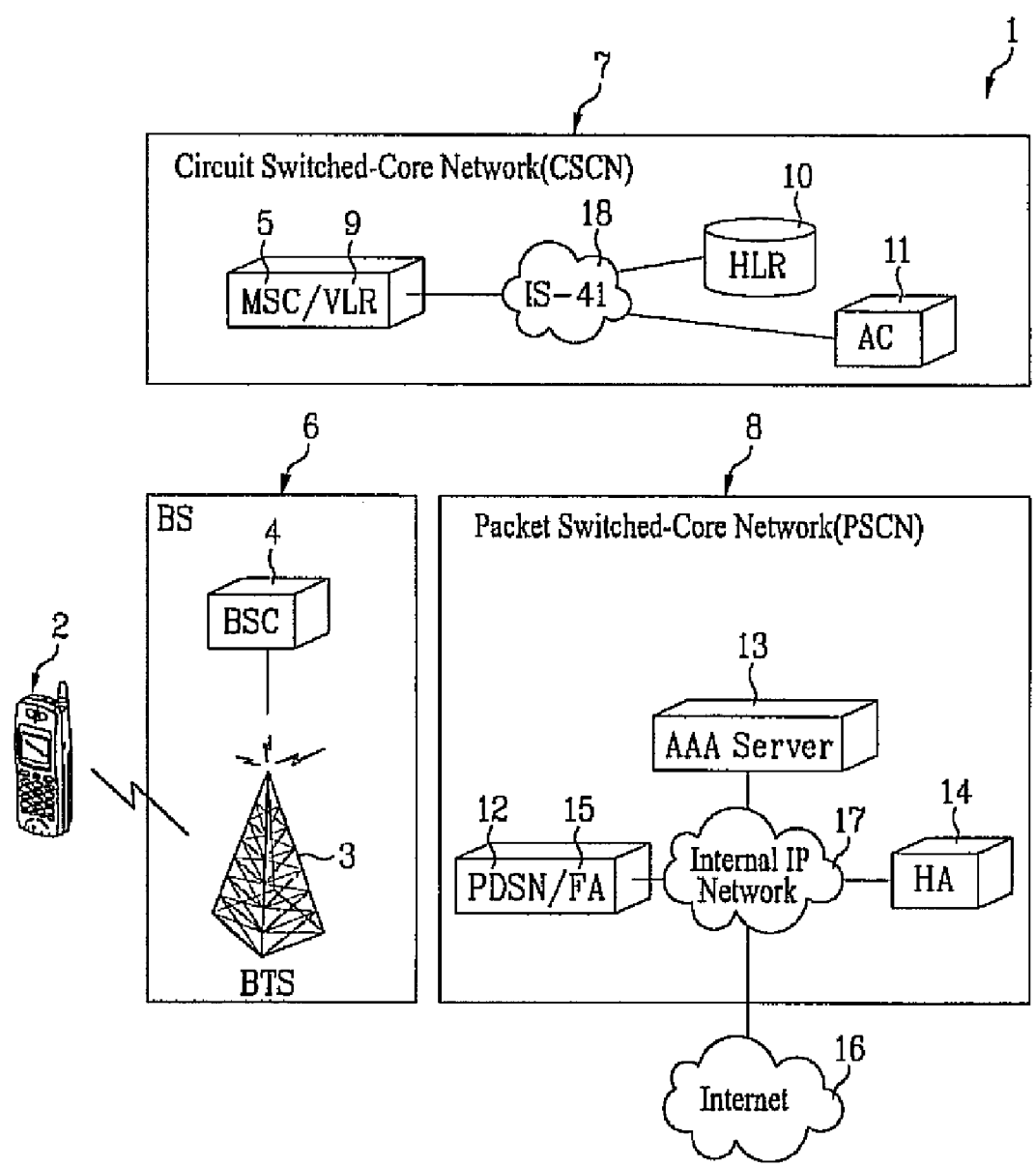
FIG. 1 depicts a wireless communication network in accordance with an embodiment of the present invention.

Referring to FIG. 1, a wireless communication network 1 is illustrated. A subscriber uses mobile terminal 2 to access network services. Mobile terminal 2 may be a portable communications unit, such as a hand-held cellular phone, a communication unit installed in a vehicle, or a fixed-location communications unit.

Electromagnetic waves from mobile terminal 2 are transmitted along a reverse link to base transceiver system (BTS) 3, which is also known as node B. The BTS includes radio devices such as antennas and equipments for transmitting and receiving radio waves. Access network 6 includes a base station controller (BSC) 4 which receives transmissions from one or more BTSs. The BSC provides control and management of the radio transmissions from each BTS by exchanging messages with the BTS and mobile switching center (MSC) 5 or internal IP network 17.

Access network 6 exchanges messages with, and transmits data to, a circuit switched core network (CSCN) 7 and packet switched core network (PSCN) 8. The CSCN provides traditional voice communications, and the PSCN provides Internet applications and multimedia services.

MSC 5 provides switching for traditional voice communications to and from mobile terminal 2, and may store information to support these capabilities. The MSC may be connected to one or more access networks 6, as well as other public networks such as, for example, a public switched telephone network (PSTN) (not shown) or an integrated services digital network (ISDN) (not shown). Visitor location register (VLR) 9 is used to retrieve information for handling voice communications to or from a visiting subscriber. The VLR may be configured within MSC 5, and may serve more than one MSC.

A user identity is assigned to the home location register (HLR) 10, which maintains for record purposes data such as subscriber information (e.g., electronic serial number), mobile directory number, profile information, current location, and authentication period. Authentication center (AC) 11 manages authentication information related to mobile terminal 2. The AC may be within HLR 10 and may serve more than one HLR. The interface between MSC 5 and the HLR 10 and AC 11 is shown as an IS-41 standard interface 18.

The packet data serving node (PDSN) 12 portion of PSCN 8 provides routing for packet data traffic to and from mobile terminal 2. PDSN 12 establishes, maintains, and terminates link layer sessions to mobile terminal 2 and may interface with one or more access networks 6 and one or more PSCNs 8. Authentication, authorization and accounting (AAA) 13 server provides Internet protocol authentication, authorization, and accounting functions related to packet data traffic. Home agent (HA) 14 provides authentication of mobile terminal IP registrations, redirects packet data to and from foreign agent (FA) 15, and receives provisioning information for users from AAA server 13. HA 14 may also establish, maintain, and terminate secure communications to PDSN 12 and assign a dynamic IP address. The PDSN is shown communicating with AAA server 13, HA 14, and the Internet 16 via internal IP network 17.

In the exemplary embodiment shown in FIG. 1, wireless communication network 1 operates according to known specifications for 1xEV-DO, which utilizes CDMA communication techniques. It should be understood that operation of embodiments of the present invention is similarly also possible in other types of radio, and other, communication systems. Therefore, while the following description describes operation of an embodiment of the present invention with respect to the 1xEV-DO system, operation of an embodiment of the present invention can analogously be described with respect to any of various other types of communication systems. An example of mobile terminal 2 operable in a 1xEV-DO system in accordance with an embodiment of the present invention will be described in more detailed in connection with a later figure.

Transmissions from BTS 3 to mobile terminal 2 are called forward link transmissions. Likewise, transmissions from mobile terminal 2 to BTS 3 are called reverse link transmissions. In general, the forward link transmission includes a plurality of frames defined by system specifications. In the exemplary communication system, the signals are received substantially during the reception of a frame on a plurality of channels (forward link channels), generally having signals for a pilot channel, control channels, supplemental channels, and dedicated channels. The supplemental channels include interleaved and spread data signals. The dedicated channel contains signaling information about the data transmitted on the supplemental channels.

When a connection is opened, mobile terminal 2 may be assigned a forward traffic channel, a reverse traffic channel, and reverse power control channel. Multiple connections may occur during a single session. There are generally two connection states in a 1xEV-DO system; a closed connection and an open connection.

A closed connection refers to a state in which mobile terminal 2 is not assigned any dedicated air-link resources and communications between the mobile terminal 2 and access network 6 are conducted over the access channel and the control channel. An open connection refers to a state where mobile terminal 2 can be assigned the forward traffic channel, a reverse power control channel, and a reverse traffic channel, and communication between mobile terminal 2 and access network 6 is conducted over these assigned channels as well as over the control channel.

Figure 2:
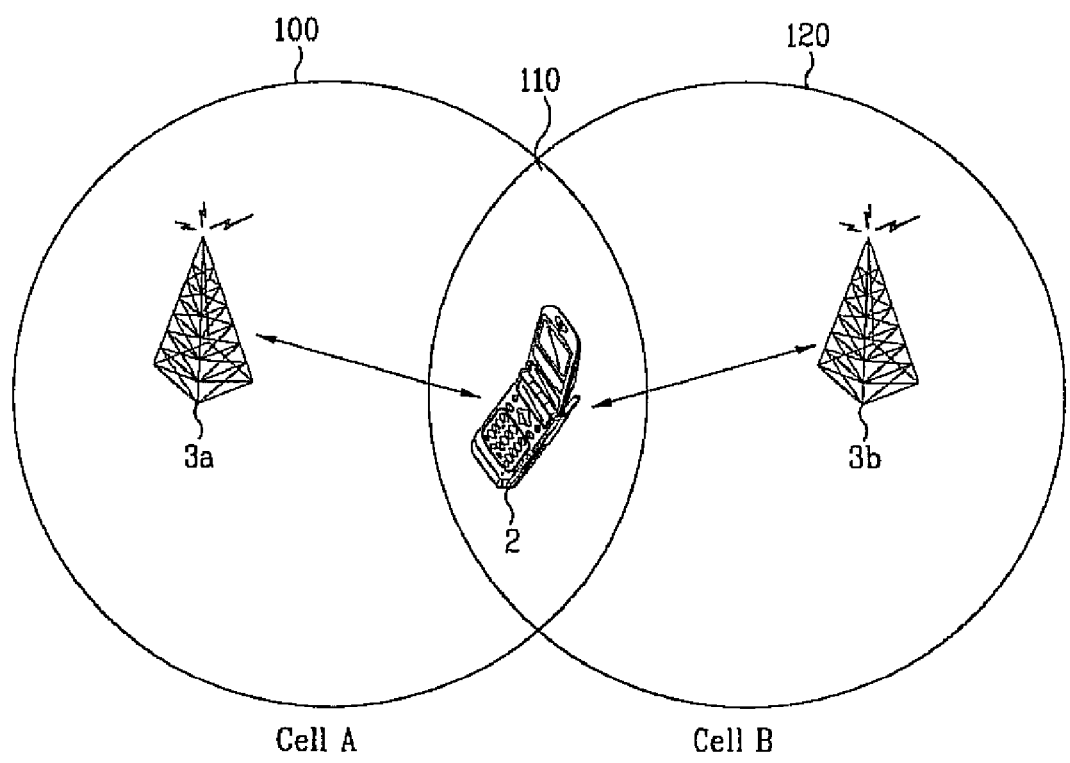
FIG. 2 depicts two base transceiver systems in communication with a mobile terminal using different carrier frequencies.

As the mobile terminal moves around within the network, it will typically reach the cell edge region of a serving base transceiver station. One such scenario is depicted in FIG. 2, which shows two base transceiver systems in communication with a mobile terminal. Mobile terminal 2 has moved to the edge of coverage area 100 of BTS 3a (Cell A), and is currently located within cell edge region 110. The cell edge region is such that the coverage area of BTS 3a overlaps with coverage area 120 of BTS 3b (Cell B). If mobile terminal 2 continues to travel in the direction of BTS 3b, a handoff process will occur and BTS 3b will ultimately become a serving base transceiver station to the mobile terminal, and communication with BTS 3a will cease.

Embodiments of the present invention relate to improving communications with the mobile terminal at the cell edge region (e.g., region 110), and exploit network capabilities relating to soft and softer handoffs. In a soft handoff, two or more signals received through different cells, for example, are simultaneously demodulated, combined, and decoded by the mobile terminal. A typical soft handoff is implemented by diversity combining (i.e., combining signals from either the same or different base transceiver station) in a manner that is transparent to the user. A softer handoff is a special type of soft handoff, and occurs when the mobile terminal communicates simultaneously with two or more sectors of the same base transceiver station.

Embodiments of the present invention consider both universal frequency reuse and non-universal frequency reuse scenarios. A typical CDMA system, for example, implements a universal frequency reuse principal such that all sectors and all cells in the system normally operate on the same frequency. Conversely, a system which implements non-universal frequency reuse is one in which the transmitting entity (e.g., BTSs 3a, 3b) communicates via forward link transmissions with a mobile terminal using different carrier frequencies. A non-universal frequency reuse scenario will be considered first.

Referring still to FIG. 2, one embodiment provides for each base transceiver station to transmit packet data at different carrier frequencies. For instance, BTS 3a may transmit packet data at a first carrier frequency, and BTS 3b may transmit packet data at a second carrier frequency. Since mobile terminal 2 is located within the overlapping coverage area, and in particular cell edge region 110, the mobile terminal may receive transmissions from both BTS 3a and BTS 3b. After demodulating the received first and second packet data transmissions, the mobile terminal may then examine the received data and identify or otherwise assess the reception quality of each of the data packets.

Typically, the packet data transmissions from both BTSs 3a, 3b represent the same identical data. In addition, BTSs 3a, 3b, may encode the transmitted data packets using the same or different encoding techniques.

It is notable that mobile terminal 2 maintains communication with both BTSs 3a, 3b, in order to receive, and continue to receive, various packet data transmissions. This is in contrast to a typical handoff process in which the connection to all but one base transceiver station is ultimately broken.

After receiving these transmissions, mobile terminal 2 may then select one of the two received data packets for use by the terminal based upon the identified reception quality. This scheme allows the mobile terminal to select the best transmission from either BTS 3a or BTS 3b.

As an alternative, the first and second packet data transmissions, respectively received from BTSs 3a, 3b, may be combined by the mobile terminal using, for example, a known technique such as code combining soft handoff (CCSH) and diversity combining, etc. This technique provides diversity gain though soft or softer handoff and coding gain by combining two higher rate code streams, thus generating a lower rate code stream.

Multiple transmit antennas may also be implemented such that each base transceiver system may be configured with multiple transmit antennas, each antenna being configured to transmit at a different carrier frequency.

As noted above, embodiments of the present invention also apply to improving communications with a mobile terminal moving along or otherwise located near the sector edge region of a cell. Such embodiments may be implemented using techniques similar to those described above with regard to the cell edge region.

Figure 3:
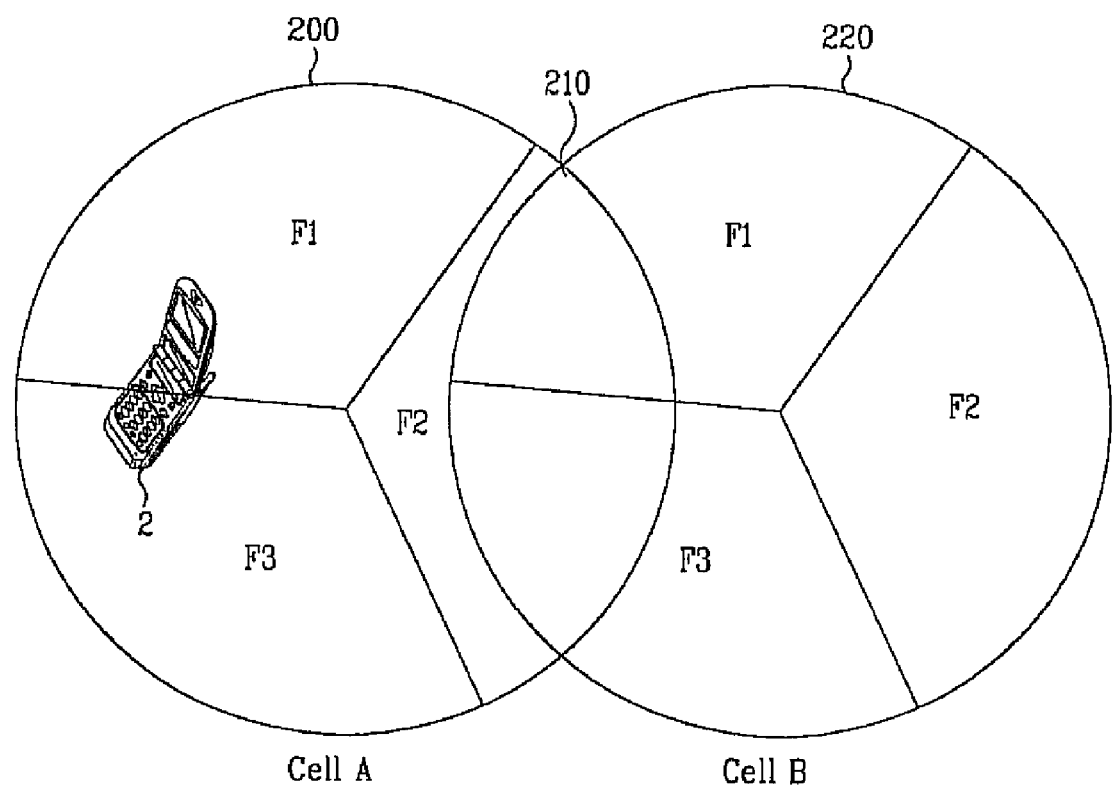
FIG. 3 depicts cells having sectors in which packet data is transmitted using different carrier frequencies.

One such scenario is depicted in FIG. 3, which shows Cell A defined by coverage area 200 and Cell B defined by coverage area 220. The base transceiver system individually associated with each of these cells has been omitted for clarity. Cell A is shown having three sectors, each sector transmitting packet data, among other transmissions, at a different carrier frequency. The different carrier frequencies of the sectors are denoted as F1, F2, and F3. Cell B is similarly configured.

Mobile terminal 2 is shown along the sector edge of cell A, and receives transmissions at two separate carrier frequencies from the same base transceiver system. This aspect is similar to the FIG. 2 embodiment in which the mobile terminal receives transmissions from two different base transceiver systems (BTSs 3a, 3b), each transmitting at a different frequency.

Referring again to FIG. 3, mobile terminal 2 receives first and second packet data transmissions from one base transceiver system. After demodulating the received first and second packet data transmissions, the mobile terminal may then examine the received data and identify or otherwise assess the reception quality of these data packets. Further operation of the mobile terminal using the received packet data may occur in a manner previously described in conjunction with FIG. 2.

As another alternative, the various cell edge and sector edge performance enhancement techniques described with regard to FIGS. 2 and 3 may be combined. An example of this embodiment is one in which the mobile terminal is located within cell edge region 210, and thus receives transmissions at frequency F1 and frequency F3 from Cell B, and frequency F2 from Cell A. In addition, the present disclosure also relates to networks having greater numbers of cells than those illustrated, as well as cells having different numbers of sectors than those shown.

Still further embodiments include the use of, for example, different orthogonal frequency-division multiplexing (OFDM) tones which replace the use of different frequencies described above. OFDM is a technique that effectively partitions the overall system bandwidth into multiple orthogonal subbands. These subbands are also referred to as tones, carriers, subcarriers, bins, and frequency channels. Each subband is associated with a set of subcarriers that can be modulated with data.

Such embodiments may be implemented using either of the cell edge and sector edge performance enhancement techniques of FIGS. 2 and 3. For instance, in FIG. 2, BTS 3a may transmit packet data at a first set of tones, and BTS 3b may transmit packet data at a second set of tones. Similar operation occurs with a mobile terminal located near a sector edge, such as that depicted in FIG. 3. For instance, the same set of tones may be utilized when non-orthogonal space time coding transmission is used. As another example, different sets of tones may be used when an orthogonal space time code is used. In these scenarios, the base transceiver system may be configured with multiple transmit antennas for each cell or sector, each antenna being configured to transmit a different set of tones.

Figure 4:
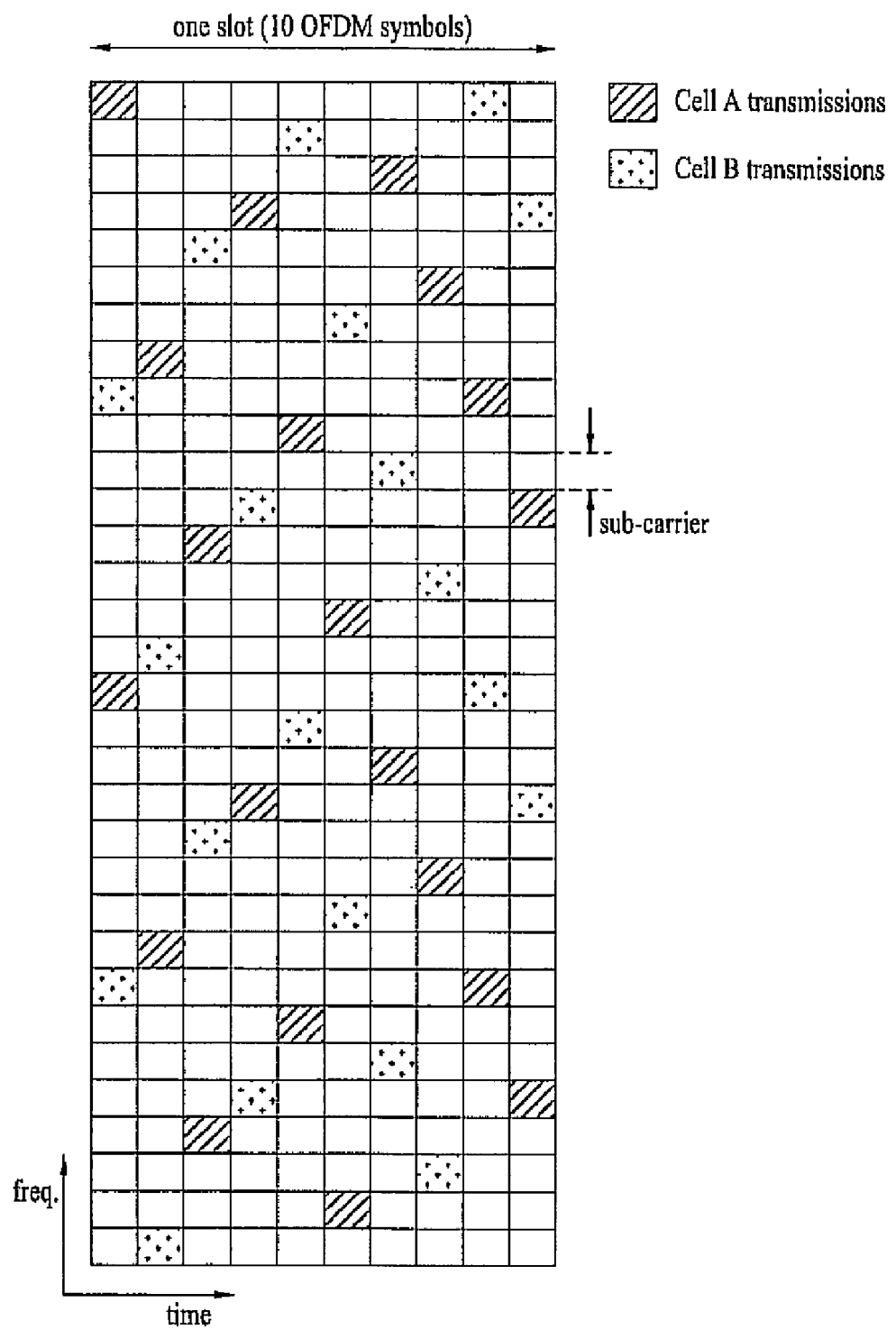
FIG. 4 is a two-dimensional grid showing an example of allocations of OFDM tones.

FIG. 4 is a two-dimensional grid showing an example of allocations of such tones. The sets of tones may be used to deliver identical packets of data, or different packets of the same data. In addition, the sets of tones may be distributed over time and frequency, or concatenated over time and frequency.

With regard to the non-universal frequency reuse scenarios, options include using two or more quasi-orthogonal or orthogonal channelization codes (such as a Walsh code for CDMA), or two or more different set of tones (for OFDM environments), as was just described. The use of the different sets of tones replaces the requirement of using a corresponding two or more different frequencies.

Figure 5:
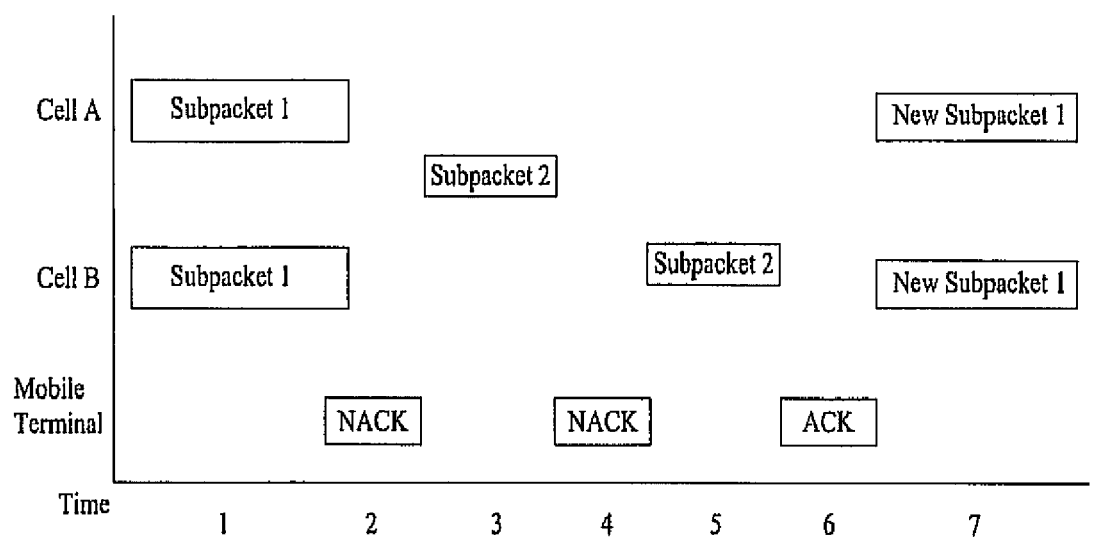
FIG. 5 depicts an embodiment using hybrid automatic repeat request (H-ARQ) in conjunction with alternating retransmission of subsequent subpackets from different transmitting entities.

In accordance with further embodiments of the present invention, the cell edge and sector edge performance enhancements disclosed herein may be implemented in conjunction with an automatic repeat request (ARQ) technique that includes hybrid ARQ (H-ARQ). An example of such embodiments is shown in FIG. 5. This retransmission embodiment results in alternating transmission of subsequent subpackets from different transmitting entities (e.g., Cell A and Cell B) upon receipt of a negative acknowledgement (NACK) message.

At time 1, Cell A and Cell B each transmit subpacket 1. Examples of such transmissions, and how the mobile terminal receives and processes such transmissions, are discussed previously with regard to FIGS. 2 and 3. In particular, the mobile terminal receives the data transmissions, demodulates the signals, and decodes the data. As part of the decoding process, the mobile terminal checks the data packet to determine whether the packet was correctly received.

At time 2, if the packet was received with an error, the mobile terminal transmits a NACK message to Cell A and Cell B. In response to receiving the NACK message, at time 3, Cell A retransmits the packet that was received with an error.

At time 4, if the packet was again received with an error, the mobile terminal again transmits a NACK message to Cell A and Cell B. In response, at time 5, Cell B retransmits the requested packet.

At time 6, the packet was now successfully received by the mobile terminal which then transmits an ACK message to Cell A and Cell B. Next, at time 7, both Cell A and Cell B transmit a new subpacket and the foregoing process may be repeated.

According to an alternative embodiment, a scheme may be implemented in which transmission power (or the traffic to pilot ratio) is adjusted or otherwise changed (increased or decreased) upon receipt of the NACK message. For instance, the retransmission of subpacket 2 is at a lower energy level than the transmission energy used to transmit subpacket 1 at time 1. A variation is to increase, instead of decrease, the transmission energy for the subpacket retransmission. The amount of energy change may vary depending upon application, and may be adjusted as required or desired.

As an alternative to changing transmission power, subsequent subpacket transmissions may be implemented by changing the number of tones in OFDM, as compared to the number of tones used to transmit the first subpacket. For example, the subsequent subpacket transmission may be accomplished using increased or decreased number of tones than the number of tones used in the transmission of the first subpacket transmission.

Figure 6:
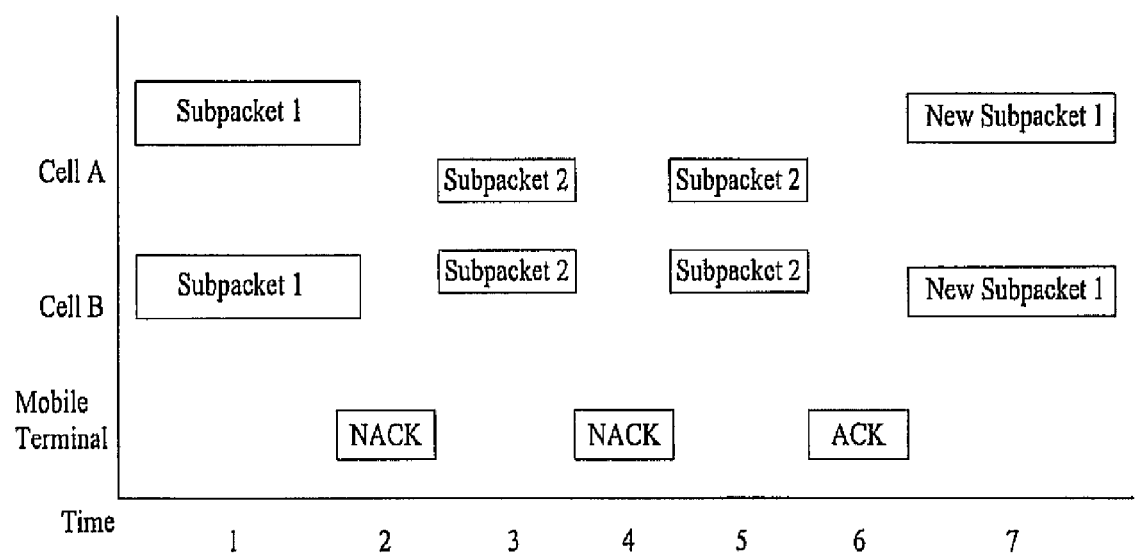
FIG. 6 depicts an embodiment using H-ARQ with retransmission of subsequent subpackets using reduced or increased transmission power.

FIG. 6 depicts an ARQ technique in accordance with another embodiment of the present invention. This embodiment also implements the just-described power change scheme such that the transmission energy of retransmitted subpackets is changed upon receipt of the NACK message. However, the FIG. 6 embodiment does not alternate retransmitted subpackets between cells In particular, both transmission entities (Cell A and Cell B) retransmit the subpacket which the mobile terminal indicates as being received in error. Although the embodiments of FIGS. 5 and 6 are described with regard to packet data transmissions, such techniques may alternatively be implemented in circuit switched signal transmissions.

Figure 7:
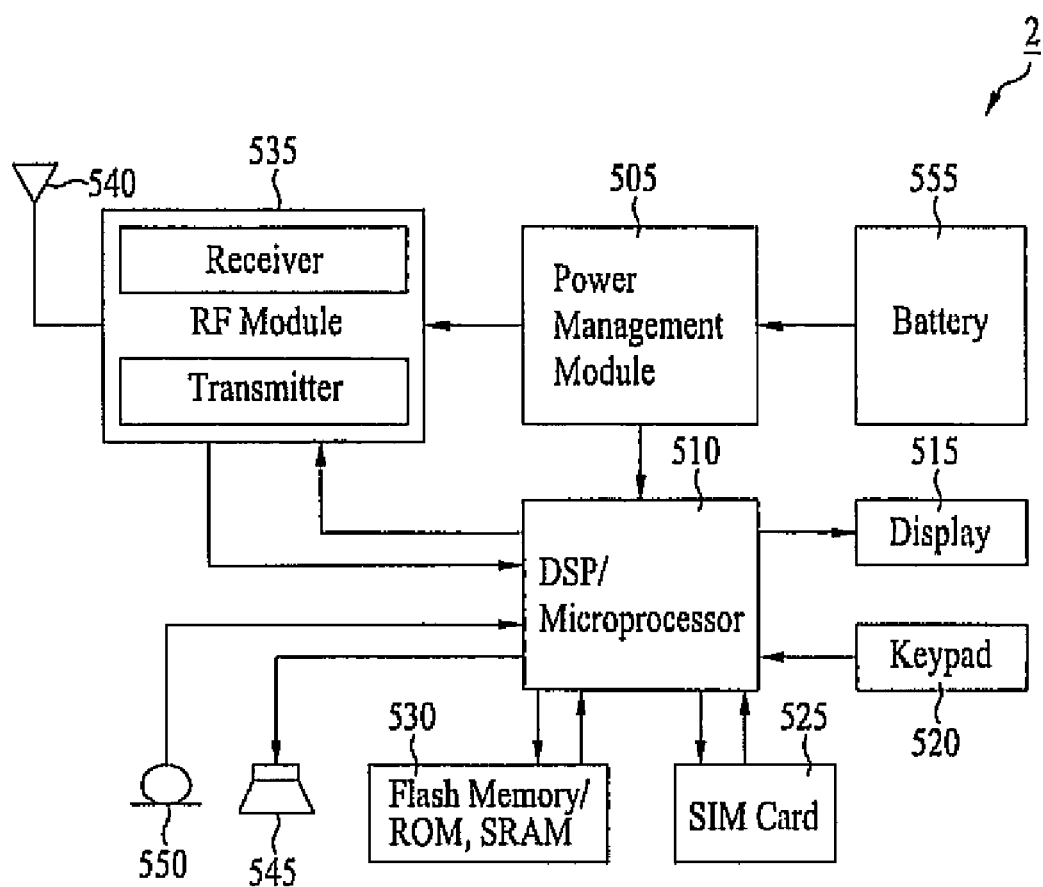
FIG. 7 is a block diagram of a mobile terminal.

FIG. 7 is a block diagram of mobile terminal 2. The mobile terminal includes processor (or digital signal processor) 510, RF module 535, power management module 505, antenna 540, battery 555, display 515, keypad 520, memory 530, subscriber identity module (SIM) card 525 (which may be optional), speaker 545, and microphone 550.

A user enters instructional information, such as a telephone number, for example, by pushing the buttons of keypad 520 or by voice activation using microphone 550. Processor 510 receives and processes the instructional information to perform the appropriate function, such as to dial the telephone number. Operational data may be retrieved from SIM card 525 or memory module 530 to perform the function. Furthermore, the processor may display the instructional and operational information on display 515 for the user's reference and convenience.

Processor 510 issues instructional information to the RF module 535 to initiate communication, for example, and to transmit radio signals comprising voice communication data. RF module 535 comprises a receiver and a transmitter to receive and transmit radio signals. Antenna 540 facilitates the transmission and reception of radio signals. Upon receiving radio signals, the RF module may forward and convert the signals to the baseband frequency for processing by processor 510. The processed signals would be transformed into audible or readable information outputted via speaker 545, for example. The processor also includes protocols and functions necessary to perform the various processes described herein with regard to cdma2000 or 1xEV-DO systems, for example.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for transmitting subpackets to a mobile terminal, said method comprising:
    transmitting subpackets from at least one of at least two base stations;
    retransmitting said subpackets from the at least one of the at least two base stations, when receiving a negative acknowledgement (NACK) signal responsive to said subpackets; and transmitting new subpackets from the at least one of the at least two base stations, when receiving an acknowledgement (ACK) signal responsive to said subpackets, wherein the NACK signal includes information for selecting which base station should retransmit said subpackets, and wherein when at least one of the at least two base stations comprises at least two antennas, the NACK signal includes information for selecting which antenna should retransmit said subpackets, wherein encoding schemes respectively used by said at least two base stations for encoding subpackets apply respectively different puncturing patterns or different repetition patterns to the respective subpackets being encoded.

2. The method according to claim 1, wherein the encoding schemes respectively used by said at least two base stations for encoding subpackets are different from each other.

3. The method according to claim 1, wherein a transmission power of said subpackets is different from a transmission power of said retransmitted subpackets.

4. The method according to claim 1, wherein said at least two base stations transmit said subpackets, said retransmitted subpackets and said new subpackets, by using orthogonal frequency-division multiplexing (OFDM).

* * * * *